Jan. 25, 1966          S. OSTROW          3,230,774
TEMPERATURE MEASURING DEVICE
Original Filed Aug. 30, 1960          2 Sheets-Sheet 1
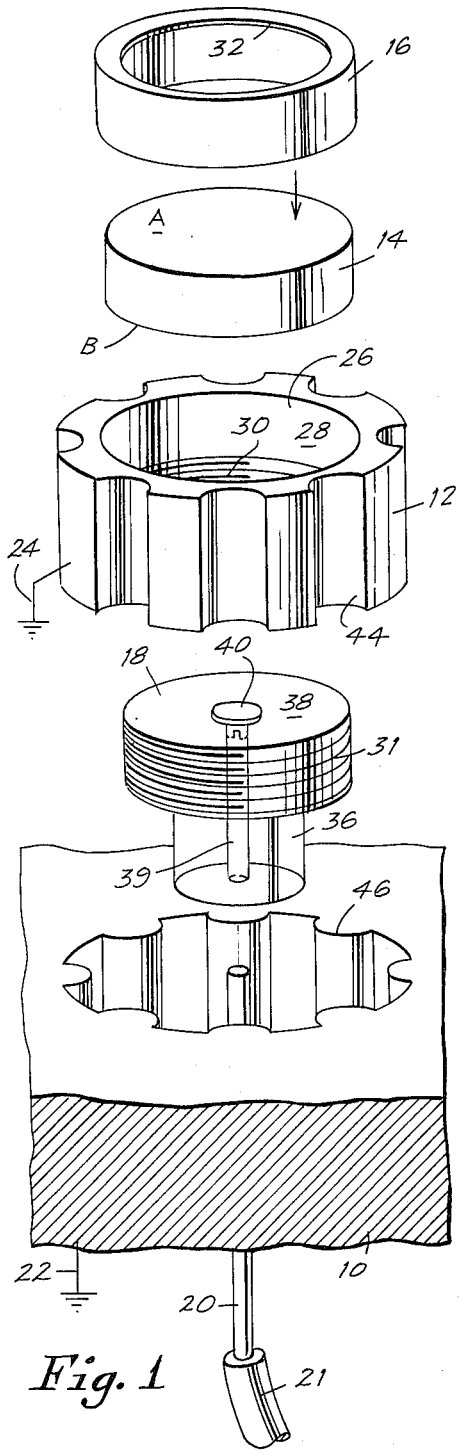
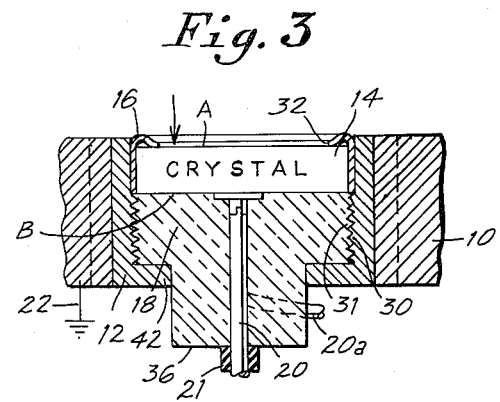
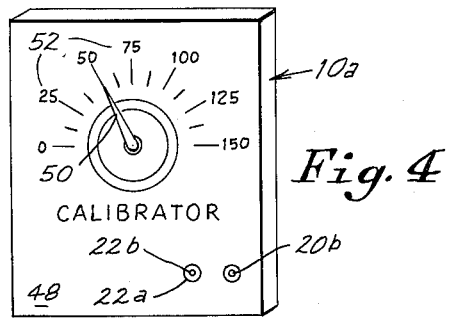
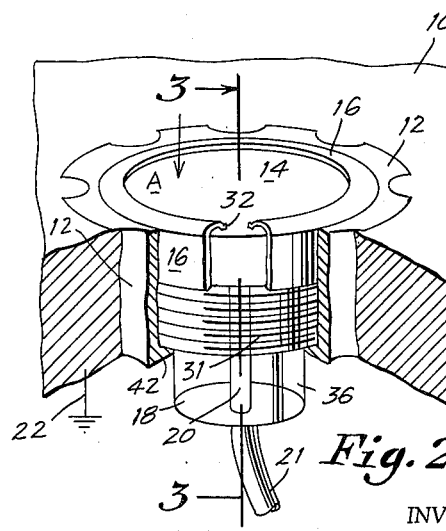
INVENTOR
Stanley Ostrow,
BY *Sol B Wiex*
ATTORNEY Jan. 25, 1966     S. OSTROW     3,230,774
TEMPERATURE MEASURING DEVICE
Original Filed Aug. 30, 1960     2 Sheets-Sheet 2

INVENTOR
*Stanley Ostrow,*

BY
ATTORNEY

United States Patent Office 3,230,774
Patented Jan. 25, 1966

3,230,774
TEMPERATURE MEASURING DEVICE
Stanley Ostrow, Silver Spring, Md., assignor, by mesne assignments, to Sensonics, Inc., Washington, D.C., a corporation of Delaware
Original application Aug. 30, 1960, Ser. No. 52,942. Divided and this application Aug. 14, 1961, Ser. No. 131,256
3 Claims. (Cl. 73—368.7)

This application is a division of Serial No. 52,942, filed Aug. 30, 1960.

My invention relates to a piezo electric crystal mount which supports the crystal pressure responsively between electrical connectors under preadjusted pressure. More practically, my crystal mount supports the crystal pressure responsively with an electrical lead contact in the preadjusted pressure sensitive relationship with one side of the crystal, an opposite side being mounted exposed and sensitive to pressure variations of various types. This preadjusted pressure sensitive mounting of my piezo crystal is useful in several systems to measure pressure variations electrically and accordingly, it can be mounted to measure the pressure of such systems or other variables of a system which can be measured in terms of pressure. My invention further relates, therefore, to combinations of my crystal mount with such systems to measure and sometimes to control the conditions thereof.

In prior mountings of a piezo crystal, the electrical contact with the crystal was either a mechanical or solder junction and the wire body and contact were free to mechanically vibrate at or near the junction with the crystal which in itself was a large source of inaccuracy since the output of the crystal is very sensitively responsive to the vibrations which vary the pressure thereon and any vibration particularly of the contacts and lead wires to the crystal is a variable, which the present invention overcomes.

The problem of adequate mounting for accurate use of a piezo crystal is overcome in the present invention by securing the crystal in a housing which leaves one face of the crystal pressure sensitively exposed to ambient or other variable pressure systems including other physical forces converted to pressures and applied to this crystal for measurement, by use of the present crystal mounting. An opposite surface of said crystal has an electrical contact mechanically held there against under a torque applied pressure, threaded support. The threaded support for the contact is of non-conductive or insulated material and adjustably urges the electrical contact against said opposite crystal face. The housing itself in pressure contact with the crystal has another permanent electrical lead or may be mounted in grounding contact with the system.

With such mount, one face of the crystal remains pressure sensitively exposed and the other face has an electrical connector pressed thereagainst in a very accurately controlled pressure. Thereby, both connections to the crystal are in themselves insensitive to pressure, the crystal itself has one face held exposed very highly sensitive to pressure, and the crystal further is held under a preadjusted pressure against its electrical contacts. With such mount the crystal had one face very highly sensitized to any desired electrical output and by pressure applied to the exposed face, after controllably presetting the crystal pressure against the electrical contact in its mount.

Such controlled sensitive mounting allows the crystal to be used for numerous applications for which it was not heretofore available, or not accurately so. For instance, a crystal, so mounted, by assembling with the pressure sensitive surface exposed to the ambient air will usefully record that pressure as it may vary; or where the carrier body, or the air in contact with the crystal is moving at high velocity relatively to each other may have the pressure variation on the crystal and its consequent current output calibrated in terms of velocity or pressure, thus to provide a useful speedometer when mounted in the nose or skin of any moving body, for instance, an automobile, a missile, plane, or the like. In like matter, the pressure variations on the sensitive surface varying the electrical output on the crystal may be used to measure relatively static pressures as in a pressure gauge, temperature, or weight, or regularity of even other measurements such as linear dimensions, as in a distance gauge; or the electrical output itself can be used as a source of electrical energy to operate fine instruments, to standardize other sources of current, or to operate a time piece or the like.

The invention is further explained by reference to the drawings in which:

FIG. 1 shows the several disassembled parts of the crystal and mount including a holder such as the skin of a vehicle or missile in which it would be supported, the several parts being arranged in the order in which they would be assembled.

FIG. 2 is a perspective of the assembly with parts broken away and in section to illustrate some internal construction.

FIG. 3 is an elevation in section through about the center of the assembly taken on the line of about 3—3 of FIG. 2.

FIG. 4 illustrates a device using the crystal for calibrating.

Figure 5:
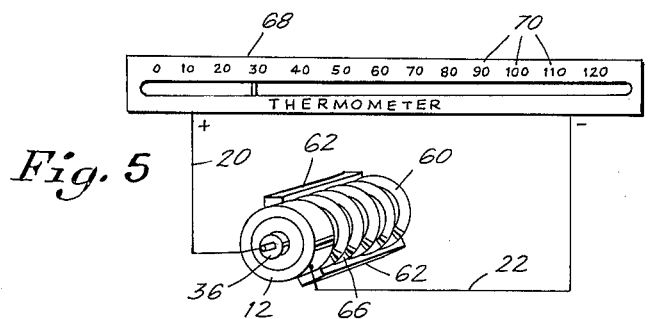
FIG. 5 illustrates a combination of the crystal with temperature expandible bellows to measure temperature.

Referring to FIG. 1, the several parts illustrated comprise a supporting body 10 and a crystal receptor or housing 12, a piezo crystal 14, a supporting bushing 16, a torque adjustable non-conductive contact support 18 and an electrical lead wire 20 from which may be stripped some of the insulation 21. The supporting body 10 may be a metal in which case it may be grounded at 22, or if it was not of metal then a grounding lead 24 would need to be attached to the crystal receptor housing 12 to complete the ground circuit.

The crystal receptor housing 12 is made of conductive or semiconductive material and is centrally bored at 26 to a smooth upper half surface 28 and a threaded lower half 30. The bushing 16 has an upper flange or lip 32 turned down as shown in FIG. 3, to have a downwardly projecting angular sharp corner. The internal diameter of the ring 16 is sized to slidingly receive the piezo crystal 14 with its upper surface A exposed through the top opening in the ring 16. The outer diameter of the ring 16 is sized to be tightly press-fitted into the annular smooth portion 28 of the bore 26. Thus the bushing 16 is press-fitted in the receptor housing 12, and the crystal 14 is slidingly fitted therein as shown in FIGS. 2 and 3 with its top surface A exposed and with upper edges held by the upper flange 32.

The contact support 18 is formed of non-conductive material such as hard insulating plastic, and has its outer cylindrical surface 31 threaded to mate with the threads 30 in the lower half of the housing 12. The lower portion of the support 18 continues downward in a projecting boss 36 of smaller diameter than the surface 31 and projects below the mount 12 in assembled position as shown in FIGS. 2 and 3, for purposes which will appear. The central portion of the contact support 18, is axially bored at 39 and has a metal contact member 40 tightly flush fitted in the top surface 38 in the end of the bore 39. A contact lead wire 20 passes upward though closely held in the bore 39, and is tightly secured as by soldering or by set screw (not shown) to the lead contact 40. In this manner the lead 20 and the contact 40 are tightly fitted into the top surface of the non-conductive contact support 18 as to be substantially integral therewith, but can be adjustably rotated by adjusting the screw thread positions 30 and 31 relative to each other, that is, by rotating the projecting boss. Such rotation adjusts the pressure of the contact 40 against the underside of the crystal 14.

It is not essential, but useful, to have the bottom opening of the mount 12 partially closed by a flange 42 which acts as a stop for the threads 30–31 and the lower position of the contact member 18. It is also useful to have the outer annular surface of the housing 12 cut with one or several ribs, splines, or keyways 44 which allows the assembled crystal to be inserted and securely held in use by some supporting body 10 which is correspondingly keyed, ribbed or splined at 46 to easily receive the mounted crystal securely fixed therein for immediate use or removal.

In assembling the crystal and its mounting element in a unit such as shown in FIGS. 2 and 3, as described, the contact support member 18 with the contact 40 and wire 20 secured therein, is first assembled into the mount 12 by rotating the threaded portions so that the support 18 is at the lowermost position against the flange 42. The crystal is then inserted into the bushing 16 and the bushing is then press-fitted into the housing 12, close to, but allowing a small clearance between the lower crystal surface B and the top 38 of the contact support 18. Thereafter, the projecting boss 36 is slowly rotatably adjusted, turning the threads 31 with respect to the mating threads 30 of the housing, thereby adjusting the pressure of the contact holder 18 and the contact 40 against the bottom surface B of the crystal 14, and in turn pressing the entire crystal against the contact lip 32 of the ring 16 to a very exact and calibrated contact pressure and consequent electrical output characteristic.

In this matter it will be seen that the crystal is secured under pressure, a rotary torque applied by a new thread adjustment of threads 30 and 31 between the contact 40 bearing against its lower surface and the downturned shoulder or lip portion 32 bearing electroconductively against a small annular margin of the top crystal surface A with most of the upper surface A remaining exposed to ambient pressure. Thus, by rotating the projecting portion 36 of the contact holder, the pressure between the surfaces A and B or the crystal is exactly adjusted and the crystal 14 is securely retained firmly between electroconductive contacts. Moreover, by emplacing the entire contact mount in a splined or keyed holder 10, it is emplaced for immediate use ready to supply its calibrated electrical output with exact variation responsive to any pressure variation upon the crystal applied to its exposed surface A in the direction of the arrow.

Such mount has numerous uses. It will be understood as known to one skilled in the art that the electrical output of a piezo crystal varies according to the pressure upon the crystal. The pressure is first applied and adjusted upon crystal 14, with the torque rotation of the contact holder 18 which forces contact 40 against the under side of the crystal increasing its pressure upon the crystal as it is rotated clockwise. For instance, as the boss 36 is grasped and rotated, rotating mating threads 31 within threads 30, the face 38 of the holder and its contact 40 is forced against the underside of crystal 14 with progressively increasing pressure as it is rotated. If the crystal 14 of FIG. 3, accordingly, is mounted in a holder 10a, as shown in FIG. 4, with the boss portion 36 extending and projecting through the plane of the face 48, and any clockwise rotation of that boss will, by increasing the pressure on the crystal increase its voltage and/or current output. Conversely, if the boss 36 is rotated counterclockwise, the current output is decreased. A dial position indicator arm 50 may be mounted to the end of the boss 36 as shown. The face 48 of the holder may have marking 52 thereon comprising a dial face. These markings may be positioned and adjusted after suitable calibration to be read in terms of voltage output with variations of pressure on the crystal 14 inasmuch as that pressure will vary with the radial torque position of the indicator 50, with suitable calibration. The indicator 50 will be set in such calibration to accurately point to a dial position indicative of the voltage output of the crystal 14. The lead wire 20 can be taken off through a side of the boss 36 as shown in dotted line position 20a of FIG. 3 for purposes of leading wires behind the face 48 of the holder 10a. The lead wire 20, however, could also pass directly through the axis of rotation of indicator 50. The lead wire 20, not shown in FIG. 4, is connected to an insulated binding position 20b as an output terminal for the crystal. An input terminal, which may be merely a similar binding post 22b, is preferably provided in the same area for purposes of making contact with the housing 12 through a lead wire 24. If the holder material 10a is conductive, then the binding post 22b may be merely a grounding contact 22a. After calibration of the dial settings 52 and indicator arm 50 with respect to the crystal mount position in the holder 10a, the entire device is useful as a meter for standardizing or calibrating other electrical devices because its electrical output across terminal 20b and 22b is readable from the dial position of pointer arm 50. It is a useful laboratory tool for measuring the electrical conditions of other electrical units. Accordingly, the device shown in FIG. 4, as described, is useful as a standardized electrical output element variable according to its dial setting to a desired electrical output.

As thus described, an improved piezo crystal mount is provided which has by torque adjustment a preset pressure of crystal contacts upon the crystal, thereby providing adjustably firm controlled pressure of the electrical contacts upon the crystal. No inaccuracies develop upon the use of this crystal due to stresses upon the crystal contacts. At the same time, the absolute pressure and output of the crystal is adjustably set. This type of mount lends itself to numerous uses requiring an accurately preset pressure temperature in terms of pressure variations upon the crystal.

I claim:

1. A thermometer comprising a piezo eelctric crystal mount comprising a conductive housing securing and supporting a piezo-electric crystal with an open surface portion of the crystal body pressure-responsively exposed, a non-conductive contact support having an electrical contact firmly secured therein, said contact support being adjustably fastenable in said conductive housing with its electrical contact insulated from said housing and adjustably bearing in electroconductive contact against an opposite surface of said crystal, electrical leads connecting opposite sides of said crystal to an electrical indicator device responsive to the electrical output of said crystal and temperature sensitive mechanical element supported by the crystal housing bearing mechanically against the pressure sensitive face of said crystal to vary the pressure thereon, the mechanical pressure variation of said element being responsive to ambient temperature surrounding said crystal, the said electrical indicating device being calibrated in terms of temperature whereby ambient temperature variations produce pressure responsive variations of electrical conditions of said electrical indicating device readable thereon in temperature degrees.

2. The device as defined in claim 1 in which the temperature responsive pressure element is a bellows having its outer end rigidly fixed and supported by the crystal mount housing, and the inner end of said bellows expandable with temperature, bears with variable pressures against the pressure sensitive face of said crystal responsive to ambient temperature variations.

3. The device as defined in claim 1 wherein the crystal is supported in said mount under preadjusted pressure, said pressure being applied by adjustably fastening the contact support against the said opposite surface of said crystal.

References Cited by the Examiner

UNITED STATES PATENTS

| | | | |
|---|---|---|---|
| 2,423,609 | 7/1947 | Middleton | 73—362 |
| 2,498,737 | 2/1950 | Holden | 310—8.7 |
| 2,536,025 | 1/1951 | Blackburn | 73—362 |
| 2,822,690 | 2/1958 | Walker | 73—182 |
| 2,917,642 | 12/1959 | Wright et al. | 310—8.7 |
| 3,086,132 | 4/1963 | Ostrow | 310—9.1 |

ISAAC LISANN, *Primary Examiner.*